Figure 1:
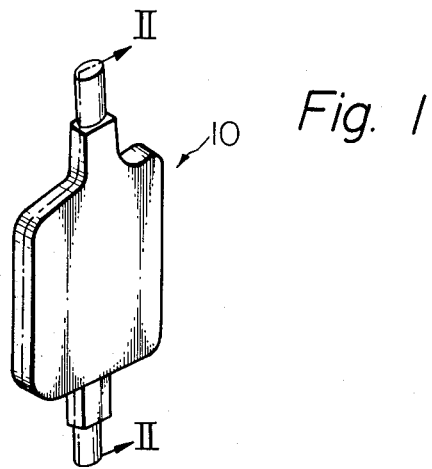

United States Patent [19]
Murakami et al.

[11] 3,955,126
[45] May 4, 1976

[54] ELECTROLYTIC CAPACITOR WITH COMBINED SOLID ELECTROLYTE OF TCNQ SALTS AND NITROGEN-CONTAINING POLYMERS OF MODERATE MOLECULAR WEIGHT

[75] Inventors: Mutsuaki Murakami; Masahito Yasuda; Susumu Yoshimura, all of Kawasaki, Japan

[73] Assignee: Matsushita Electric Industrial Company, Limited, Japan

[22] Filed: Oct. 9, 1974

[21] Appl. No.: 513,265

[30] Foreign Application Priority Data
Oct. 12, 1973  Japan.............................. 48-115230

[52] U.S. Cl................................ 317/230; 252/62.2
[51] Int. Cl.² .......................................... H01G 9/00
[58] Field of Search...................... 317/230; 252/62.2

[56] References Cited
UNITED STATES PATENTS

| | | |
|---|---|---|
| 3,138,746 | 6/1964 | Burger................................ 317/230 |
| 3,547,423 | 12/1970 | Jenny................................. 317/230 |
| 3,679,944 | 7/1972 | Yoshimura et al. ................ 317/230 |
| 3,709,821 | 1/1973 | Yoshimura et al. ................ 317/230 |
| 3,766,443 | 10/1973 | Asakawa et al..................... 317/230 |
| 3,812,039 | 5/1974 | Niwa.................................. 317/230 |
| 3,872,358 | 3/1975 | Murakami et al. ................. 317/230 |

*Primary Examiner*—Andrew J. James
*Attorney, Agent, or Firm*—Robert E. Burns; Emmanuel J. Lobato; Bruce L. Adams

[57] ABSTRACT

The electrolyte is composed of a complex salt of 7,7,-8,8-tetracyanoquinodimethane(TCNQ) and a nitrogen-containing polymer capable of dissolving the salt. The capacitor characteristics are largely affected by both the molecular weight and the amount of the polymer, and the capacitor of improved characteristics is provided by the use of the polymer of a mean molecular weight between 2,000 and 200,000 in an amount between 2 and 10% by weight of the TCNQ salt.

5 Claims, 2 Drawing Figures

ELECTROLYTIC CAPACITOR WITH COMBINED SOLID ELECTROLYTE OF TCNQ SALTS AND NITROGEN-CONTAINING POLYMERS OF MODERATE MOLECULAR WEIGHT

This invention relates to a solid electrolyte capacitor having an anodically formed dielectric oxide film and an electrolyte coating formed on the film, which coating is composed of a nitrogen-containing polymer and a salt of 7,7,8,8-tetracyanoquinodimethane.

A thin oxide film formed on an anodizable metal such as aluminum or tantalum, which is commonly called a valve metal, by anodic oxidation of the metal, serves as a dielectric of a solid capacitor. As is well known in the art, such a film possesses essentially eminent dielectric characteristics, but in practice it cannot be devoid of considerable faults and micropores developed during and/or after anodization. As a result, dielectric characteristics and leakage current of a capacitor utilizing an anodically oxidized film always remain below the levels expected from the values inherent to an ideal oxide film. An electrolyte disposed between the dielectric oxide film and a counter electrode of a practical electrolyte capacitor, therefore, is required to have a function of electrolytically oxidizing the anode in the case of polarization thereof to reform the defective oxide film apart from its principal function as a substantial cathode.

Manganese dioxide has long been used as an excellent solid electrolyte to be coated on an anodic dielectric oxide film. There is, however, a significant problem in forming a manganese dioxide coating in intimate contact with the oxide film. Such a coating is usually formed by repeated cycles of applying a manganese nitrate solution on the oxide film and thermally decomposing the nitrate into the dioxide at considerably high temperatures, e.g., ranging from 200° to 400°C. The multiple exposure to the high temperature inevitably causes damage to the inherently weak dielectric oxide film and results in unsatisfactory characteristics of the produced capacitor. Accordingly it is necessary to provide repeated steps of re-anodizing between and after the heating steps. A capacitor produced by such complicated procedures has nevertheless shortcomings such as a relatively large leakage current and a relatively low working voltage.

Various organic semiconductive substances have been proposed to replace manganese dioxide so as to eliminate the above drawbacks. Examples of organic semiconductive substances promising as solid electrolyte materials for their good anodical oxidizing properties are some charge transfer complex compounds, the acceptor of which is a nitro compound or a quinone compound. Another group of organic semiconductive compounds featuring superior anodizing capability is a group of salts having 7,7,8,8-tetracyanoquinodimethane, hereinafter referred to as TCNQ for brevity, as the anion component. Solid electrolyte capacitors based on these organic semiconductive compounds are described, e.g. in U.S. Pat. No. 3,586,923. These compounds can be coated on an anodic oxide film without requiring high temperatures and hence scarcely causing damage to the oxide film. Furthermore, they exhibit better anodizing or reforming properties than manganese dioxide.

Theoretically, these organic semiconductive compounds serve as advantageous electrolytes for solid electrolyte capacitors, but improved capacitors of practical use can be obtained only when a practical method of coating such a compound on the dielectric oxide film is established. The method is required to give a dense, uniform and strongly adhering coating without damaging the inherent property of the compound or its ability to reform an anodic oxide film.

At first, application of an organic solvent solution of a TCNQ salt was proposed, e.g., in U.S. Pat. Nos. 3,214,648 and 3,214,650. Although the method is quite easy to carry out, such a method usually fails in giving the desired degree of denseness and adhesion strength of the resulting coating. Next, a semiconductive polymer or a polymer capable of dissolving a semiconductive salt has been seeked for, and U.S. Pat. Nos. 3,424,698 and 3,483,438 disclose some polymers which dissolve TCNQ and its salts and electrolyte capacitors based on such polymers, respectively. A problem with respect to the polymers according to these patents resides in that relatively large amounts of the polymer are required to obtain an electrolyte coating of such denseness and adhesion as to ensure the desired level of stability and life of the resulting capacitor. In the capacitors of U.S. Pat. No. 3,483,438, for example, a polymer content of more than 50% by weight is necessary to prepare an electrolyte system in which a TCNQ salt is dissolved to saturation.

The smaller the amount of a polymer or binder in an electrolyte system, the better for obtaining a capacitor of excellent characteristics because the capacitor characteristics are substantially determined by the physical properties of the polymer itself when a large amount of polymer is used. Practical disadvantages resulting from a large polymer content in an electrolyte layer of a solid capacitor are as follows:

1. increase in the specific resistance of the electrolyte and hence increase in the dielectric loss of the capacitor;
2. decrease in the capacitance of the capacitor;
3. deterioration of the capacitor due to expansion of the polymer.

One approach for overcoming these disadvantages is disclosed in U.S. Pat. No. 3,679,944. The electrolyte layer of this patent is a dispersion of a TCNQ complex in a polymer, wherein the amount of the polymer is limited to 40%, at most, by weight of the electrolyte. This system allows TCNQ salts to be closely in contact with the anodic oxide film by the use of considerably small amounts of polymer binder, but involves some unfavorable problems resulting from the system being a dispersion system. To describe concretely: (a) when a highly etched anode is used, the attainable maximum capacitance is not sufficiently large as compared with the case of a dissolved-salt system, (b) the resistance of the electrolyte layer is higher than the corresponding value in a dissolved-salt system, and (c) an organic semiconductor or TCNQ salt is required preliminarily to be pulverized into fine particles by troublesome procedures.

It is a main object of the present invention to provide a solid electrolyte capacitor which eliminates, if not completely, at least largely, these shortcomings of the prior art capacitors.

It is another object of the invention to provide a solid electrolyte capacitor, whose electrolyte layer has a dissolved phase of a TCNQ salt in a polymer, but the amount of the polymer is limited to considerably small values.

It is still another object of the invention to provide a solid electrolyte capacitor having a relatively large capacitance, but a relatively small loss value.

In general, the invention relates to a solid electrolyte capacitor of a known construction having a dielectric oxide film formed on a valve metal anode, a cathode and a solid electrolyte layer formed between and in intimate contact with both the electrodes, which electrolyte contains a semiconductive TCNQ salt and a polymer capable of dissolving the salt. According to the invention, the mean molecular weight of the polymer is in the range between 2,000 and 200,000, and the amount of the polymer is 2 to 10% by weight of the TCNQ salt.

Figure 2:
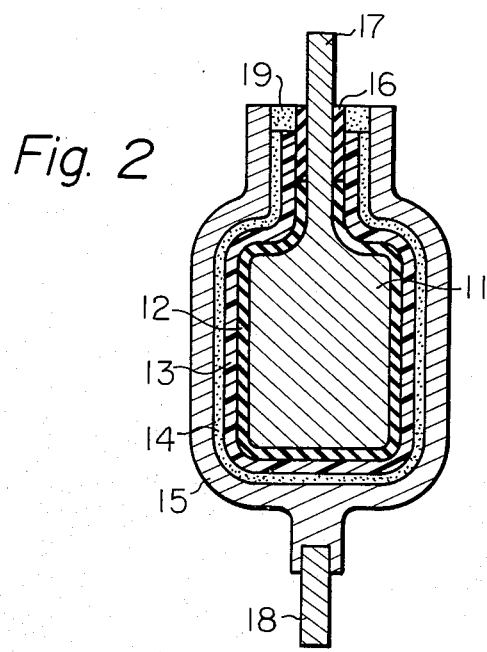

The invention will be fully understood from the following detailed description with reference to the accompanying drawing, in which:

FIG. 1 is a perspective view of a solid electrolyte capacitor according to the invention; and FIG. 2 is a vertical section taken along line II—II of FIG. 1.

A solid electrolyte capacitor according to the invention is constructed in a well known manner as illustrated by way of example in FIGS. 1 and 2. In capacitor 10, an anode 11 is a foil of a valve metal such as aluminum or tantalum and has a thin and dense dielectric film 12 formed thereon by anodic oxidation. The surface of the anode 11 may be etched before anodization to obtain a good quality of the dielectric oxide film 12 as is well known in the art. The entire surface of the oxide film 12 is covered with a coating of an organic solid electrolyte 13, which will be described hereinafter in more detail. The coating 13 is electrically in contact with and physically fixed to a metal case 15 having an integral cathode lead 18 by means of a conventional conductive and adhesive material 14 such as a silver paste or colloidal graphite. An anode lead 17 is connected to the anode 11 and is partially coated with an insulator 16 so as to be isolated from the electrolyte coating 13. A space between the case 15 and the lead 17 is filled with an insulating adhesive 19.

The electrolyte coating 13 is composed of a semiconductive salt of TCNQ and a nitrogen-containing polymer capable of dissolving the salt. The salt of TCNQ is selected from various known ones and preferably from complex salts of TCNQ, each molecule of which salts contains a neutral or non-ionized TCNQ molecule other than the cation component and the TCNQ ion. Examples are (quinolinium)$^+$TCNQ$^-$.TCNQ, (pyridinium)$^+$TNCNQ$^-$.TCNQ and (phenadinium)$^+$TCNQ$^-$.TCNQ, including alkyl derivatives of the respective cation components. The nitrogen-containing polymer is selected from the following group, all of which are known to have the property of dissolving TCNQ and its salts: polymers of acrylonitrile, methacrylonitrile, vinylpyridine and urethane; copolymers of these compounds with each other; and copolymers of these compounds with other polymerizable compounds, e.g. butadiene, which are not necessarily nitrogen-containing.

We have discovered that the molecular weight of the nitrogen-containing polymer has a significant influence on the important characteristics of the capacitor 10 such as capacitance, resistance or loss and leakage current. The discovery further includes that such capacitor characteristics are dependent also on the polymer content of the electrolyte coating 13. Practical capacitors 10 having relatively large capacitances, but considerably small magnitudes of loss and leakage current can be obtained when the mean molecular weight of the polymer lies in the range between about 2,000 and about 200,000 and the weight ratio of the polymer to the TCNQ salt is from about 2 to about 10%. It is to be noted that these optimum polymer weight ratio values are quite different from or smaller than the values disclosed in U.S. Pat. No. 3,483,438, which are more than 50%. Furthermore, it is an important fact that the advantage of the above described molecular weight range is substantially common to the above described nitrogen-containing polymers.

The electrolyte coating 13 is formed from a solution of the polymer and the TCNQ salt in a known solvent such as a dimethylformamide or methylethyl ketone, which dissolves both the polymer and the TCNQ salt. Such solvents may alternatively be used as a mixture with each other or with another solvent such as acetone. The solution is applied on the dielectric oxide film 12 and thereafter the solvent is evaporated. On evaporation of the solvent, the polymer in the resulting solid coating 13 still contains the TCNQ salt dissolved therein almost to saturation, and the excess TCNQ salt exists as a dispersed crystalline phase. Thus, there is present a dissolved phase of a TCNQ salt in a nitrogen-containing polymer in the coating 13 of the invention unlike the electrolyte coating of U.S. Pat. No. 3,679,944.

The following examples illustrate the variations in the characteristics of the capacitor 10 when aluminum is used as the anode 11 and the composition of the electrolyte coating 13 is varied.

EXAMPLE 1

The electrolyte coating 13 was formed from solutions of (quinolinium)$^+$TCNQ$^-$.TCNQ and polyacrylonitrile (hereinafter referred to as PAN) having a mean molecular weight of 40,000 in dimethylformamide (hereinafter referred to as DMF). The weight ratios of PAN and DMF to the TCNQ salt were varied, and the capacitance, loss and leakage current of the capacitors were measured. The compositions of the electrolyte solutions and the measured characteristic values are presented in the following Table 1.

Table 1

| Electrolyte Solution (Per 100 mg of quinolinium(TCNQ)$_2$) | | Capacitor Characteristics | | |
|---|---|---|---|---|
| PAN(mg) | DMF(ml) | Capacitance ($\mu$F) | Loss ($\mu$F.$\Omega$) | Leakage Current ($\mu$A) |
| 100 | 4 | 0.06 | 43 | 0.1 |
| 50 | 4 | 0.07 | 49 | 0.1 |
| 20 | 4 | 0.10 | 61 | 0.08 |
| 10 | 4 | 0.12 | 67 | 0.1 |
| 10 | 2 | 0.31 | 52 | 0.02 |
| 10 | 1 | 0.17 | 45 | 0.04 |
| 5 | 4 | 0.42 | 36 | 0.07 |
| 5 | 2 | 0.61 | 41 | 0.05 |
| 5 | 1 | 0.55 | 39 | 0.02 |
| 2 | 2 | 0.28 | 81 | 0.01 |
| 2 | 1 | 0.18 | 95 | 0.02 |

These experimental results show clearly that the capacitor characteristics are greatly dependent on the polymer content of the electrolyte coating 13 and that the optimum value is 5% by weight with respect to the quantity of the TCNQ salt. Although the general properties of the coating 13 were excellent when 50 mg and 100 mg of PAN were used per 100 mg of the TCNQ salt, the capacitors had only relatively small capacitances and showed rather larger leakage currents.

EXAMPLE 2

This example illustrates how the molecular weight of PAN affects the characteristics of the capacitor. The electrolyte solutions were prepared from the same substances as in Example 1, but three different kinds of PAN having mean molecular weights of 2,000, 50,000 and 200,000, respectively, were used in place of the PAN of Example 1. The results are shown in Table 2.

Table 2

| Electrolyte Solution (per 100 mg of quinolinium(TCNQ)$_2$) | | | Capacitor Characteristics | | |
|---|---|---|---|---|---|
| PAN (mg) | M.W. of PAN | DMF (ml) | Capacitance ($\mu$F) | Loss ($\mu$F.$\Omega$) | Leakage Current ($\mu$A) |
| 10 | 200,000 | 2 | 0.08 | 70 | 0.09 |
| 10 | 50,000 | 2 | 0.31 | 52 | 0.02 |
| 10 | 2,000 | 2 | 0.22 | 50 | 0.03 |
| 5 | 200,000 | 2 | 0.19 | 50 | 0.06 |
| 5 | 50,000 | 2 | 0.61 | 41 | 0.05 |
| 5 | 2,000 | 2 | 0.53 | 40 | 0.02 |
| 5 | 200,000 | 1 | 0.17 | 81 | 0.07 |
| 5 | 50,000 | 1 | 0.55 | 39 | 0.02 |
| 5 | 2,000 | 1 | 0.46 | 51 | 0.03 |
| 2 | 200,000 | 2 | 0.11 | 107 | 0.04 |
| 2 | 50,000 | 2 | 0.28 | 81 | 0.01 |
| 2 | 2,000 | 2 | 0.19 | 67 | 0.03 |

It is apparent from the data in Table 2 that the capacitor characteristics, particularly the capacitance, are affected by the molecular weight of PAN and that the degree of the affection is significant when the molecular weight is relatively large. Among the three molecular weight values, 50,000 was most advantageous at every PAN weight ratio. The decrease to 2,000 in the mean molecular weight had only slight degrees of adverse effects on the capacitor characteristics, but the increase to 200,000 caused the capacitance values to decrease to such a level as is considered a practical lower limit even when the PAN content was at the optimum 5%. From this tendency, mean molecular weights larger than 200,000 are apparently inappropriate for producing the electrolyte coating for a capacitor with satisfactory characteristics.

EXAMPLE 3

This example illustrates the effects of the quantity and molecular weight of the polymer when polyurethane is used in place of PAN in Example 2. The experiment was carried out with respect to the mean molecular weights of 5,000, 50,000 and 200,000. The results are shown in Table 3.

Table 3

| Electrolyte Solution (per 100 mg of quinolinium(TCNQ)$_2$) | | | Capacitor Characteristics | | |
|---|---|---|---|---|---|
| Polyurethane | | | | | |
| Quantity (mg) | M.W. | DMF (ml) | Capacitance ($\mu$F) | Loss ($\mu$F.$\Omega$) | Leakage Current ($\mu$A) |
| 20 | 50,000 | 4 | 0.03 | 89 | 0.12 |
| 10 | 200,000 | 2 | 0.02 | 75 | 0.11 |
| 10 | 50,000 | 2 | 0.11 | 70 | 0.03 |
| 10 | 5,000 | 2 | 0.08 | 70 | 0.06 |
| 5 | 200,000 | 2 | 0.09 | 51 | 0.09 |
| 5 | 50,000 | 2 | 0.27 | 48 | 0.06 |
| 5 | 5,000 | 2 | 0.20 | 50 | 0.06 |
| 2 | 200,000 | 2 | 0.02 | 88 | 0.08 |
| 2 | 50,000 | 2 | 0.18 | 78 | 0.05 |
| 2 | 5,000 | 2 | 0.14 | 78 | 0.07 |

As seen from Table 3, the capacitor characteristics are dependent on both the polymer content and the molecular weight with generally similar tendencies to the case of Example 2 despite the difference in the polymer. The optimum values were again obtained with the molecular weight of 50,000 and the polymer weight ratio to the TCNQ salt of 5%.

Also it was experimentally ascertained that the appropriateness of these values holds when either polyvinylpyridine or polymethacrylonitrile is used as the polymer to dissolve quinolinium(TCNQ)$_2$.

EXAMPLE 4

A copolymer of acrylonitrile and butadiene having a mean molecular weight of 100,000 was used to dissolve quinolinium(TCNQ)$_2$. The copolymer and the TCNQ salt were dissolved in a mixture of DMF and acetone, which was advantageous over single solvents applicable to this system such as DMF or methylethyl ketone. The effects of the weight ratio of this copolymer on the capacitor characteristics are shown in Table 4.

Table 4

| Weight Ratio Copolymer/TCNQ salt (%) | Capacitance ($\mu$F) | Loss ($\mu$F.$\Omega$) | Leakage Current ($\mu$A) |
|---|---|---|---|
| 50 | 0.01 | 90 | 0.1 |
| 40 | 0.03 | 100 | 0.1 |
| 30 | 0.04 | 100 | 0.1 |
| 20 | 0.20 | 60 | 0.05 |
| 10 | 0.31 | 50 | less than 0.01 |
| 5 | 0.41 | 40 | less than 0.01 |
| 2 | 0.30 | 40 | less than 0.01 |

Although the absolute values of the capacitance were somewhat smaller than the values in Examples 1 and 2 in which polymers of acrylonitrile were used, best and practicable values were obtained again at the copolymer weight ratios of around 5%.

It is concluded from the experimental results obtained in these examples that solid electrolyte capacitors featuring relatively large capacitances and relatively small magnitudes of loss values and leakage currents as well as the excellent anodic-film-reforming property can be produced when the mean molecular weight of the nitrogen-containing polymer to dissolve the TCNQ salt is in the range between 200,000 and 2,000, preferably around 50,000, and the amount of the polymer is 2 to 10%, preferably about 5%, by weight of the TCNQ salt, whichever of the afore-mentioned nitrogen-containing polymers may be selected.

What is claimed is:

1. In a solid electrolyte capacitor having a dielectric oxide film formed on a first electrode of an anodically oxidizable metal, a second electrode and a solid electrolyte layer formed between and in intimate contact with both electrodes, the solid electrolyte containing a semiconductive salt of 7,7,8,8-tetracyanoquinodimethane(TCNQ) and a nitrogen-containing polymer capable of dissolving the salt of TCNQ, the improvement comprising utilizing for said polymer, a polymer having a mean molecular weight in the range between 2,000 and 200,000 and in an amount of to 2 to 10% by weight of said salt of TCNQ.

2. The improvement according to claim 1, wherein the nitrogen-containing polymer is selected from the group consisting of polymers of acrylonitrile, methacrylonitrile, urethane and vinylpyridine, their copolymers with each other and their copolymers with butadiene.

3. The improvement according to claim 2, wherein the salt of TCNQ is a complex quinoline salt of TCNQ.

4. The improvement according to claim 3, wherein the amount of the polymer is substantially 5% by weight of the salt of TCNQ.

5. The improvement according to claim 3, wherein the mean molecular weight of the polymer is substantially 50,000.

* * * * *